UNITED STATES PATENT OFFICE 2,567,351

PROCESS FOR THE MANUFACTURE OF BENZHYDRYL ETHERS

George Rieveschl, Jr., Grosse Pointe Woods, Mich., assignor to Parke, Davis & Company, Detroit, Mich., a corporation of Michigan No Drawing. Application August 5, 1946, Serial No. 688,421

10 Claims. (Cl. 260—247.7)

This invention relates to a process for obtaining basically substituted benzhydryl ethers and their acid addition salts. The free bases of the basically substituted benzhydryl ethers obtained by the process of the invention have the general formula,

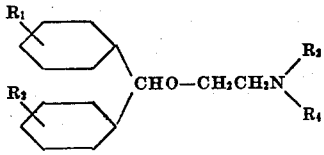

where $R_1$ and $R_2$ are the same or different substituents and represent hydrogen, an alkyl radical containing 1 or 2 carbon atoms or an alkoxy radical containing 1 or 2 carbon atoms, $R_3$ and $R_4$ are the same or different alkyl radicals containing 1 to 3 carbon atoms inclusive or $R_3$ and $R_4$ taken with —N< may be a saturated six-membered heterocyclic ring such as piperidine, a methyl substituted piperidine, morpholine, a methyl substituted morpholine, thiomorpholine and the like.

It has been found that compounds of the above general formula, or their acid addition salts, may be obtained in yields of up to about 85% by the reaction of a benzhydryl halide of the formula,

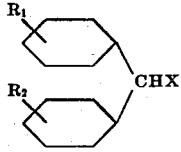

with an amino alcohol of the formula,

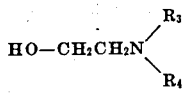

where $R_1$, $R_2$, $R_3$ and $R_4$ have the same significance as given above and X is a chlorine, bromine or iodine atom.

In order to effect the above reaction, the reaction mixture must be heated at a temperature above about 100° C., but the reaction may be carried out either in the presence or absence of an inert organic solvent. Preferably, a solvent for the reaction is used, as it results in slightly improved yields of the desired products. Some examples of the solvents which may be used as reaction mediums are benzene, toluene, xylene, turpentine, α-pinene, β-pinene, dipentene, p-cymene and the like. When the reaction is carried out in either the presence of or absence of a solvent, it is preferable from the standpoint of yields to use at least about two moles of the amino alcohol for each mole of benzhydryl halide. However, the reaction may be carried out in the absence of a solvent using only one mole of amino alcohol in which case the product formed is not the free base of the amino ether but an acid addition salt of the free base.

The basically substituted benzhydryl ethers of the invention may be isolated from the reaction mixture by a number of different methods. For example, when two moles of the amino alcohol have been used in the reaction, the hydrohalide salt of the amino alcohol can be washed out of the crude reaction mix with water or withdrawn as a lower layer and the water-insoluble material distilled under reduced pressure to obtain the free base of the desired amino ether compounds. The free base can then be converted to a solid acid addition salt such as the hydrochloride salt which can be made into pills or filled into capsules. Alternatively, the water-insoluble material of the reaction mixture can, after drying, be converted directly to a hydrohalide acid addition salt by treatment with dry hydrogen halide and the crude product purified by recrystallization. However, when large quantities of the hydrohalide salts of the basically substituted benzhydryl ethers are desired, I prefer to first isolate the amino ether from the water-insoluble portion of the reaction mixture as the acid oxalate acid addition salt and then to decompose this salt to obtain the pure amino ether free base. The hydrohalide acid addition salts of the amino ethers are obtained from this free base by the same method used for converting the distilled free base to the hydrohalide salts. More specifically, the isolation and purification of the amino ethers through the acid oxalate addition salt is effected in the following manner.

The solvent, if a solvent is used for the reaction, and the excess amino alcohol are distilled from the water-insoluble fraction of the reaction mixture at atmospheric pressure or, if desired, at a slightly reduced pressure. The crude free base of the amino ether present in the distillation residue is reacted with at least one equivalent of oxalic acid, preferably in its commercial form as the dihydrate, in a water-miscible lower aliphatic alcohol such as ethanol, isopropanol or n-propanol. The crystalline acid oxalate salt of the amino ether which separates from the solution in practically pure form is collected, suspended in water, decomposed by the addition of strong alkali and the purified free base extracted from the alkaline solution with a water-immiscible solvent such as ether, benzene or toluene. The free base of the amino ether may be obtained by evaporation of the solvent or the base in the solution may, after drying, be converted to the hydrohalide salt by treating the solution with an excess of dry hydrogen halide. However, when large amounts of the basically substituted benzhydryl ethers are being prepared it is more economical to merely draw off the free base of the amino ether which separates as an oil from the alkaline solution rather than extract or take up the free base in a water-immiscible solvent. The free base can then be converted to a hydrohalide salt by simply dissolving it in a suitable solvent and treating the resultant solution with an alcoholic solution of the hydrogen halide.

The compounds obtained by the new process are powerful anti-histamine agents. They are also useful in preventing smooth muscle spasms induced by histamine, acetyl choline or barium chloride. Another property is that they inhibit gastric secretion which has been induced either by meal or histamine stimulus. The new compounds may be administered to humans either as the free base or their hydrochloride or other acid addition salts. They may be given orally, parenterally, rectally or as a vapor or mist. They find particular use in humans for treatment of allergic conditions (asthma, urticaria, histamine cephalalgia, and anaphylactic shock) and smooth muscle spasms (biliary spasm and dysmenorrhea.) For example, the compound shown in Example 1, β-dimethylethyl benzhydryl ether hydrochloride, may be administered to humans orally in a dosage of 100 to 600 mg. per day and intravenously in a dosage of 10 to 100 mg. per day. However, because of the high activity of this compound and the other compounds of this invention, it has been found that a dosage of 150 mg. per day orally or 20 mg. per day by the intravenous route is usually sufficient in the treatment of smooth muscle spasms and most allergic conditions.

This application is a continuation-in-part of my copending application, Serial No. 531,639, filed April 18, 1944, now Patent No. 2,421,714 issued June 3, 1947.

The invention is illustrated by the following examples.

*Example 1.—β-Dimethylaminoethyl benzhydryl ether*

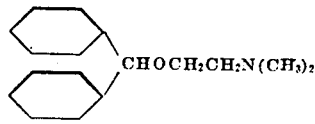

(a) 123 g. of benzhydryl bromide is added over a period of one hour to 178 g. of β-dimethylaminoethanol at refluxing temperature. After the addition has been completed the mixture is refluxed and stirred for an additional sixteen hours. The mixture is cooled and the bottom layer consisting of the crude hydrobromide salt of β-dimethylaminoethanol drawn off. The excess amino alcohol is distilled from the upper layer in vacuo and the residue added to a warm solution of 63 g. of oxalic acid dihydrate in 250 cc. of isopropanol. The acid oxalate salt of β-dimethylaminoethyl benzhydryl ether, M. P. 139–40° C., which separates on cooling is collected, suspended in water and treated with an excess of 25% sodium hydroxide solution. The free base, B. P. 152–4° C./3 mm., of the desired product is extracted with ether, the ether extract dried and treated with an excess of dry hydrogen chloride gas. The hydrochloride salt of β-dimethylaminoethyl benzhydryl ether which separates is collected and purified by recrystallization from isopropanol; M. P. 166–8° C.

(b) 123 g. of benzhydryl bromide is added over a period of one hour to refluxing solution of 178 g. of β-dimethylaminoethanol and 75 cc. of dipentene or turpentine. After the addition has been completed the reaction mixture is stirred and refluxed for an additional sixteen hours, cooled and the β-dimethylaminoethyl benzhydryl ether or its hydrochloride salt isolated as described in (a) above.

(c) 247 g. of benzhydryl bromide is added over a period of about one hour to 89 g. of refluxing β-dimethylaminoethanol. After the addition has been completed the mixture is heated at 130° C. for about fifteen hours and cooled. The solid reaction mass which consists of the hydrobromide salt of β-dimethylaminoethyl benzhydryl ether is recrystallized from isopropanol; M. P. 168–9° C. The hydrobromide salt is dissolved in water, an excess of 25% sodium hydroxide solution added and the free base which separates extracted with ether. The ether extract is dried and the ether evaporated to obtain the free base of β-dimethylaminoethyl benzhydryl ether.

(d) A mixture consisting of 360 lbs. of benzhydryl bromide and 10 lbs. of xylene is melted in a steam kettle and the mixture added with stirring over a period of 2 to 3 hours to a solution of 260 lbs. of β-dimethylaminoethanol in 440 lbs. of xylene. The temperature during the addition is maintained at about 130° C. After the addition is complete the material which is contained in a 150 gal. still is refluxed for sixteen hours (140° C.) and allowed to cool. The lower layer which separates, c.a. 250 lbs., is withdrawn from the bottom of the still and the xylene removed from the material in the still under slight vacuum. The residue, 42–45 gal., consists of crude β-dimethylaminoethyl benzhydryl ether.

The crude β-dimethylaminoethyl benzhydryl ether is added slowly with stirring to a warm solution of 145 lbs. of oxalic acid dihydrate in 170 gal. of isopropanol and the solution allowed to cool. The acid oxalate salt of the amino ether is collected and dried in vacuum at 120° F.; M. P. 139–40° C.

500 lbs. of the acid oxalate salt of the amino ether, prepared as above, is suspended in 80 gal. of cold water and a cold solution of 220 lbs. of potassium hydroxide in 40 gal. of water added slowly with stirring. Stirring is discontinued and the mixture allowed to separate into two layers. The upper layer which consists of the purified free base of β-dimethylaminoethyl benzhydryl ether is separated and treated with 40 lbs. of salt in 15 gal. of water. The mixture is allowed to separate into two layers and the salt solution is drawn off. The free base of the amino ether is dried over 40 lbs. of anhydrous sodium sulfate, the drying agent removed by filtration and washed with several portions of isopropanol. The free base of the amino ether and the isopropanol washings are added to 55 gals. of isopropanol and the resulting solution treated with a saturated solution of dry hydrogen chloride in isopropanol until it is faintly acid to wet Congo red paper. The hydrogen chloride solution is added at such a rate that the temperature does not rise above 35° C.° during the addition. The mixture is cooled to 10° C. and the white crystals of β-dimethylaminoethyl benzhydryl ether hydrochloride collected by filtration and dried in vacuo at 120° F.; M. P. 168–9° C.

150 mg. orally per day of the hydrochloride salt of β-dimethylaminoethyl benzhydryl ether or 20 mg. per day by the intravenous route is an optimum dosage for use in the treatment of patients suffering from smooth muscle spasms and most histamine allergies.

*Example 2.—β-N-piperidylethyl benzhydryl ether*

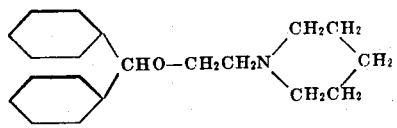

247 g. of benzhydryl bromide is added to refluxing solution of 258 g. of β-N-piperidylethanol and 100 cc. of toluene. After the addition has been completed the mixture is refluxed about fifteen hours, cooled and the lower layer consisting of the hydrobromide salt of β-N-piperidylethanol drawn off. The upper layer is distilled in vacuo to obtain the desired β-N-piperidylethyl benzhydryl ether as a colorless liquid.

If desired, the β-N-piperidylethyl benzhydryl ether may be isolated as the free base through the acid oxalate addition salt instead of by vacuum distillation of the water insoluble fraction of the reaction mixture. This is accomplished in the following manner:

The excess amino alcohol and toluene are distilled from the upper layer of the reaction mixture at atmospheric pressure and the residue added to a warm solution of 126 g. of oxalic acid dihydrate in 500 cc. of isopropanol. The crystalline acid oxalate salt which separates from the solution is collected, suspended in water and treated with an excess of 25% potassium hydroxide solution. The free base of the product which separates as an oily layer from the alkaline solution in almost pure form is drawn off and stored as such or used in the preparation of an acid addition salt as described below.

The free base is converted to the hydrochloride salt by dissolving it in dry ethyl ether and adding an excess of dry gaseous hydrogen chloride gas. The precipitated salt is collected and purified by recrystallization from isopropanol; M. P. 168.5–9.5° C.

β-N-piperidylethyl benzhydryl ether hydrochloride may be administered in the same dosage as the compound of Example 1 in the treatment of patients suffering from smooth muscle spasms and histamine allergies.

If an equivalent amount of β-N-(3-methylpiperidyl) ethanol is substituted for the β-N-piperidylethanol used in the above procedure, the product obtained is β-N-(3-methylpiperidyl)ethyl benzhydryl ether.

*Example 3. — β-N-morpholinylethyl benzhydryl ether*

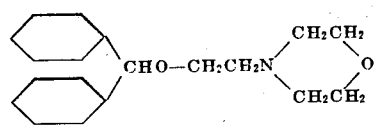

202 g. of benzhydryl chloride is added to a refluxing solution of 262 g. of β-N-morpholinylethanol and 75 cc. of p-cymene over a period of about one hour. After the addition has been completed, the mixture is refluxed for about an additional fifteen hours, cooled and the lower layer drawn off. The upper layer is subjected to distillation in vacuo to remove the solvent and any remaining amino alcohol, the residue cooled and added to a warm solution of 126 g. of oxalic acid dihydrate in 500 cc. of isopropanol. The crystalline acid oxalate salt of the product which separates is collected, suspended in water and treated with an excess of 25% sodium hydroxide solution. The free base is extracted with ether, the ether extract dried and treated with an excess of dry hydrogen chloride gas. The hydrochloride salt of β-N-morpholinylethyl benzhydryl ether which separates is collected and purified by recrystallization from absolute ethanol-ether mixture or isopropanol; M. P. 182–3° C.

The hydrochloride salt of this product may be given in a dosage of about 250 mg. per day orally or 35 mg. per day intravenously in the treatment of histamine allergies or smooth muscle spasms.

*Example 4.—β-Diethylaminoethyl benzhydryl ether*

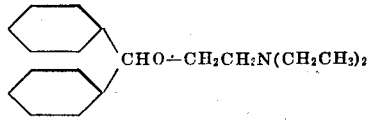

294 g. of benzhydryl iodide is added over a period of about one hour to 351 g. of β-diethylaminoethanol at reflux temperature with stirring. After the addition has been completed the mixture is refluxed for about ten hours and then the excess amino alcohol removed by distillation in vacuo. The residue is extracted with ether and the ether evaporated. The residue is distilled in vacuo to obtain the desired β-diethylaminoethyl benzhydryl ether as a colorless liquid; B. P. 199–202° C./11.5 mm.

The free base is taken up in a small amount of isopropanol and an excess of dry hydrogen bromide in isopropanol added. The hydrobromide salt is collected and purified by recrystallization from isopropanol. This salt may be administered to humans for the treatment of smooth muscle spasms or histamine allergies. The optimum dosage is about the same as that of the compound of Example 3.

*Example 5.—Di-n-propylaminoethyl p,p'-dimethyl benzhydryl ether*

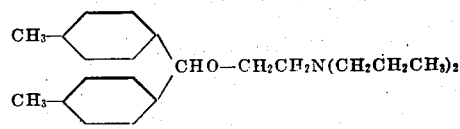

275 g. of p,p'-dimethyl benzhydryl bromide is added over a period of one hour to a refluxing solution of 270 g. of di-n-propylaminoethanol and 75 cc. of p-cymene and after the addition has been completed the reaction mixture stirred and refluxed for about twelve hours. The mixture is cooled, the lower layer drawn off and discarded and the upper layer subjected to distillation in vacuo to remove the solvent and any remaining amino alcohol. The residue is added to a warm solution of 126 g. of oxlaic acid dihydrate dissolved in 500 cc. of isopropanol, the mixture cooled and the crystalline acid oxalate salt collected. The salt is suspended in water, treated with an excess of 25% sodium hydroxide solution and the free base of the desired product extracted with ether. The ether extract is dried and treated with an excess of dry hydrogen bromide gas. The white hydrobromide salt of β-di-n-propylaminoethyl p,p'-dimethyl benzhydryl ether which separates is collected and purified by recrystallization from isopropanol.

The hydrobromide salt of the compound of this example may be used in the treatment of patients suffering from smooth muscle spasms or histamine allergies. The dosages normally required are similar to those given in the previous examples.

*Example 6.—β-Methylethylaminoethyl o-methoxy benzhydryl ether*

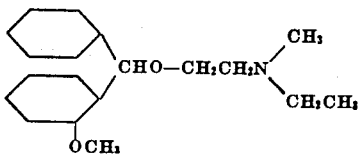

277 g. of o-methoxy benzhydryl bromide is added slowly to a refluxing solution of 75 cc. of xylene and 206 g. of β-methylethylaminoethanol and after the addition is complete the solution refluxed for an additional twelve hours. The mixture is cooled and the bottom layer drawn off and discarded. The top layer is distilled in vacuo to obtain the desired β-methylaminoethyl o-methoxy benzhydryl ether. The free base is converted to the hydrochloride salt by dissolving it in ether, treating the solution with an excess of dry hydrogen chloride gas and collecting the precipitated salt which is then purified by recrystallization from n-propanol.

The hydrochloride salt of β-methylethylaminoethyl o-methoxy benzhydryl ether may be used in the treatment of various histamine allergies and also in the treatment of smooth muscle spasms. The dosages usually used for these purposes are about the same as those given in the previous examples.

Attention is called to other somewhat related copending applications as follows: Serial No. 640,685, filed January 11, 1946, now abandoned; Serial No. 640,686, filed January 11, 1946, now Patent No. 2,508,422; Serial No. 640,687, filed January 11, 1946, now abandoned; Serial No. 660,406, filed April 8, 1946, now Patent No. 2,483,434; Serial No. 688,420, filed August 5, 1946; Serial No. 688,422, filed August 5, 1946, now abandoned; Serial No. 688,423, filed August 5, 1946, now abandoned; Serial No. 688,424, filed August 5, 1945, now Patent No. 2,453,729; Serial No. 688,425, filed August 5, 1946, now Patent No. 2,483,435; Serial No. 688,426, filed August 5, 1946, now Patent No. 2,437,711; Serial No. 688,427, filed August 5, 1946, now Patent No. 2,483,436; Serial No. 739,985, filed April 8, 1947, now Patent No. 2,427,878; Serial No. 751,983, filed June 2, 1947, now Patent No. 2,454,092; Serial No. 751,984, filed June 2, 1947, now Patent No. 2,483,671; Serial No. 751,985, filed June 2, 1947, now Patent No. 2,455,949; Serial No. 780,099, filed October 15, 1947, now Patent No. 2,527,962; Serial No. 15,257, filed March 16, 1948; and Serial No. 33,432, filed June 16, 1948, now Patent No. 2,527,963.

What I claim as my invention is:

1. Process for obtaining a basically substituted benzhydryl ether compound of the class consisting of a free base and its acid addition salts, said free base having the formula,

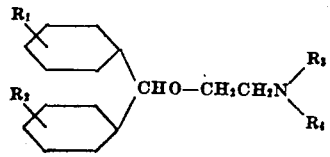

which consists in reacting a benzhydryl halide of the formula,

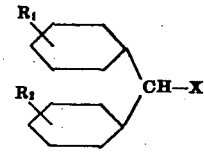

with an amino alcohol of the formula,

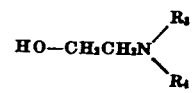

at a temperature of over 100° C., where $R_1$ and $R_2$ are members of the class consisting of hydrogen, alkyl radicals of 1 to 2 carbon atoms inclusive and alkoxy radicals of 1 to 2 carbon atoms inclusive, $R_3$ and $R_4$ are members of the class consisting of alkyl radicals of 1 to 3 carbon atoms inclusive and further members wherein $R_3$ and $R_4$ taken together with —N< form piperidine and morpholine and X is a member of the class consisting of chlorine, bromine and iodine.

2. Process for obtaining a basically substituted benzhydryl ether compound of the class consisting of a free base and its acid addition salts, said free base having the formula,

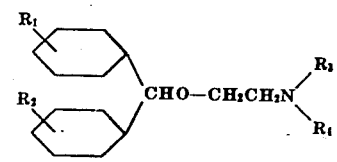

which consists in reacting a benzhydryl halide of the formula,

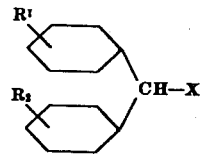

with an amino alcohol of the formula,

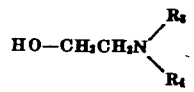

at a temperature of over 100° C. in an inert organic solvent, where $R_1$ and $R_2$ are members of the class consisting of hydrogen, alkyl radicals of 1 to 2 carbon atoms inclusive and alkoxy radicals of 1 to 2 carbon atoms inclusive, $R_3$ and $R_4$ are members of the class consisting of alkyl radicals of 1 to 3 carbon atoms inclusive and further members wherein $R_3$ and $R_4$ taken together with —N< form piperidine and morpholine and X is a member of the class consisting of chlorine, bromine and iodine.

3. Process for obtaining a basically substituted benzhydryl ether compound having the formula,

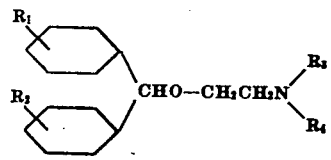

which consists in reacting one mol of a benzhydryl halide of the formula,

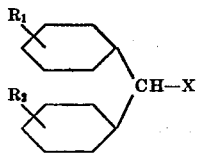

with at least about two mols of an amino alcohol of the formula,

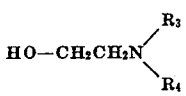

at a temperature of over 100° C. in an inert organic solvent, where $R_1$ and $R_2$ are members of the class consisting of hydrogen, alkyl radicals of 1 to 2 carbon atoms inclusive and alkoxy radicals of 1 to 2 carbon atoms inclusive, $R_3$ and $R_4$ are members of the class consisting of alkyl radicals of 1 to 3 carbon atoms inclusive and further members wherein $R_3$ and $R_4$ taken together with —N< form piperidine and morpholine and X is a member of the class consisting of chlorine, bromine and iodine.

4. Process for obtaining a basically substituted benzhydryl ether compound having the formula,

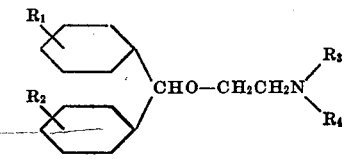

which consists in reacting one mol of a benzhydryl halide of the formula,

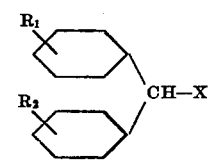

with at least about two mols of an amino alcohol of the formula,

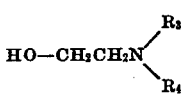

at a temperature of over 100° C. in an inert organic solvent, thereafter separating the hydrohalide salt of the amino alcohol formed during the reaction, removing said organic solvent from the reaction mixture and reacting the crude free base of the basically substituted benzhydryl ether so obtained with at least one equivalent of oxalic acid in a water-miscible lower aliphatic alcohol, separating the acid oxalate addition salt of said free base, decomposing the salt with aqueous alkali and recovering the purified free base of the basically substituted benzhydryl ether from the alkaline solution, where $R_1$ and $R_2$ are members of the class consisting of hydrogen, alkyl radicals of 1 to 2 carbon atoms inclusive and alkoxy radicals of 1 to 2 carbon atoms inclusive, $R_3$ and $R_4$ are members of the class consisting of alkyl radicals of 1 to 3 carbon atoms inclusive and further members wherein $R_3$ and $R_4$ taken together with —N< form piperidine and morpholine and X is a member of the class consisting of chlorine, bromine and iodine.

5. Process for obtaining β-dimethylaminoethyl benzhydryl ether which consists in reacting one mol of benzhydryl bromide with at least about two mols of β-dimethylaminoethanol at a temperature of over 100° C. in an inert organic solvent, thereafter separating the hydrobromide salt of β-dimethylaminoethanol formed during the reaction, removing said organic solvent from the reaction mixture and reacting the crude free base of β-dimethylaminoethyl benzhydryl ether so obtained with at least one equivalent of oxalic acid in isopropanol, separating the acid oxalate addition salt of said free base, decomposing the salt with aqueous alkali and recovering the purified free base of β-dimethylaminoethyl benzhydryl ether from the alkaline solution.

6. Process for obtaining β-dimethylaminoethyl benzhydryl ether and its acid addition salts which consists in reacting a benzhydryl halide of the formula,

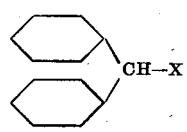

with β-dimethylaminoethanol at a temperature of over 100° C. in an inert organic solvent, where X is a member of the class consisting of chlorine, bromine and iodine.

7. Process for obtaining β-N-piperidylethyl benzhydryl ether and its acid addition salts which consists in reacting a benzhydryl halide of the formula,

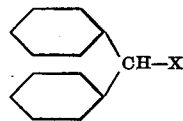

with β-N-piperidylethanol at a temperature of over 100° C. in an inert organic solvent, where X is a member of the class consisting of chlorine, bromine and iodine.

8. Process for obtaining β-N-morpholinylethyl benzhydryl ether and its acid addition salts which consists in reacting a benzhydryl halide of the formula,

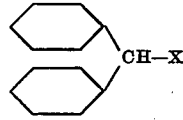

with β-N-morpholinylethanol at a temperature of over 100° C. in an inert organic solvent, where X is a member of the class consisting of chlorine, bromine and iodine.

9. Process for manufacturing β-dimethylaminoethyl benzhydryl ether which consists in forming a solution of β-dimethylaminoethanol in an inert organic solvent, heating said solution to above 100° C., gradually adding to said heated solution benzhydryl bromide until the mole ratio of benzhydryl bromide to β-dimethylaminoethanol is about 1 to 4, continuing to maintain the temperature above 100° C. after the addition of all of said benzhydryl bromide, separating the solid material from the liquid and removing said solvent from the liquid thereby obtaining β-dimethylaminoethyl benzhydryl ether as a crude free base.

10. Process according to claim 9 in which said crude free base is added to a solution of at least one equivalent of oxalic acid in a water-miscible lower aliphatic alcohol, separating the acid oxalate addition salt of said free base thus formed, decomposing said oxalate salt with aqueous alkali and recovering from the alkaline solution the purified free base of β-dimethylaminoethyl benzhydryl ether.

GEORGE RIEVESCHL, Jr.

REFERENCES CITED

The following references are of record in the file of this patent:

UNITED STATES PATENTS

| Number | Name | Date |
| --- | --- | --- |
| 862,675 | Stolz et al. | Aug. 6, 1907 |
| 1,543,287 | Hahl | June 23, 1925 |
| 1,836,047 | Somerville | Dec. 15, 1931 |
| 1,894,865 | Hartmann et al. | Jan. 17, 1933 |
| 2,136,604 | Bailey | Nov. 15, 1938 |
| 2,234,933 | Shelton | Mar. 11, 1941 |

OTHER REFERENCES

Friedel et al.: Bull. de Soc. Chim. de Paris, 1st part, vol. XXXIII, new series, 1880, pp. 339–340.

Barnett: "Preparation of Organic Compounds," J. and A. Churchill (London), 2nd ed., pp. 16–17, 1920.

Ward: J. Chem. Soc., Proceedings, part 2, pp. 2289–2290, 1927.

Degering: "Organic Nitrogen Compounds," pp. 581–582 (University Lithoprinters, Ypsilanti, Mich., 1945).

Mee: "Riechter's Organic Chemistry," vol. III, p. 191 (Elsevier Publishing Co., N. Y., 1946).